US012757809B2

(12) United States Patent
Andrejuk

(10) Patent No.: US 12,757,809 B2
(45) Date of Patent: Oct. 13, 2026

(54) DISC BLADE ANGLE CONTROL SYSTEM FOR AN AGRICULTURAL IMPLEMENT

(71) Applicant: CNH Industrial America LLC, New Holland, PA (US)

(72) Inventor: Nicholas Andrejuk, Hanford, CA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 526 days.

(21) Appl. No.: 18/129,156

(22) Filed: Mar. 31, 2023

(65) Prior Publication Data

US 2024/0324480 A1 Oct. 3, 2024

(51) Int. Cl.
*A01B 63/00* (2006.01)
*A01B 33/02* (2006.01)
*A01B 63/10* (2006.01)

(52) U.S. Cl.
CPC .......... *A01B 63/002* (2013.01); *A01B 33/024* (2013.01); *A01B 63/10* (2013.01)

(58) Field of Classification Search
CPC ...... A01B 63/002; A01B 33/024; A01B 63/10
USPC ........................................................... 701/50
See application file for complete search history.

(56) References Cited

U.S. PATENT DOCUMENTS 7,997,350 B2 8/2011 Shiohara et al.
9,668,399 B2 6/2017 Gates
10,768,331 B2 9/2020 Koch et al.
10,959,369 B2 3/2021 Sieling
11,419,254 B2 8/2022 Barrick et al.
2011/0120357 A1* 5/2011 Schilling ................ A01C 5/064 111/163
2011/0132628 A1* 6/2011 Gray .................... A01B 21/086 172/573
2011/0313572 A1* 12/2011 Kowalchuk ............ A01C 7/205 111/164
2016/0324064 A1* 11/2016 Gray .......................... G07F 7/06
2017/0367251 A1* 12/2017 Hamilton ............... A01C 7/203
2018/0325011 A1* 11/2018 Connell ................. A01B 35/04
2018/0368307 A1* 12/2018 Honey ................. A01B 61/046
2019/0297774 A1* 10/2019 Hamilton ............... A01B 63/32
2019/0335651 A1* 11/2019 Altomare ............ B01F 33/5021
2019/0357416 A1* 11/2019 Hughes ................ A01B 49/027
2020/0281107 A1 9/2020 Stanhope
2021/0127540 A1 5/2021 Smith et al.
2022/0183206 A1 6/2022 Nair et al.

FOREIGN PATENT DOCUMENTS

DE 102016217593 3/2017
DE 102021103040 8/2022

OTHER PUBLICATIONS

U.S. Appl. No. 18/129,185, filed Mar. 31, 2023, Nicholas Andrejuk.

* cited by examiner

*Primary Examiner* — Hunter B Lonsberry
(74) *Attorney, Agent, or Firm* — Fletcher Yoder, P.C.

(57) ABSTRACT

A disc blade angle control system for an agricultural implement includes a controller having a memory and a processor. The controller is configured to receive a signal indicative of a side load applied to a disc blade of the agricultural implement. The disc blade is configured to engage soil, and the side load corresponds to a force applied to the disc blade along an axis parallel to a rotational axis of the disc blade. The controller is also configured to control an actuator to adjust an angle of the disc blade based on the side load.

15 Claims, 5 Drawing Sheets

DISC BLADE ANGLE CONTROL SYSTEM FOR AN AGRICULTURAL IMPLEMENT

BACKGROUND

The present disclosure relates to a disc blade angle control system for an agricultural implement.

Certain agricultural implements include ground engaging tools configured to interact with soil. For example, a tillage implement may include disc blades configured to break up the soil for subsequent planting or seeding operations. Groups of disc blades may be arranged in gangs, and each gang of disc blades may be rotatably coupled to a frame of the tillage implement. In certain tillage implements, an angle of each gang may be adjustable relative to the frame, thereby facilitating adjustment of the angle of the disc blades of the gang relative to a direction of travel of the tillage implement. For example, the gang of disc blades may be rotatably coupled to a gang support, and the gang support may be pivotally coupled to the frame of the tillage implement. Accordingly, the angle of the disc blades of the gang relative to the direction of travel may be adjusted by rotating the gang support relative to the frame.

As the angle of the disc blades relative to the direction of travel increases, the degree of tillage may be enhanced. However, a large angle of the disc blades relative to the direction of travel may increase the load applied by the back side (e.g., convex side) of each disc blade to the soil, which may result in compaction of the soil. The degree of compaction may increase as the angle of the disc blades increases. The compaction caused by the disc blades may result in delayed crop emergence and/or reduced crop yield.

BRIEF DESCRIPTION

In certain embodiments, a disc blade angle control system for an agricultural implement includes a controller having a memory and a processor. The controller is configured to receive a signal indicative of a side load applied to a disc blade of the agricultural implement. The disc blade is configured to engage soil, and the side load corresponds to a force applied to the disc blade along an axis parallel to a rotational axis of the disc blade. The controller is also configured to control an actuator to adjust an angle of the disc blade based on the side load.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
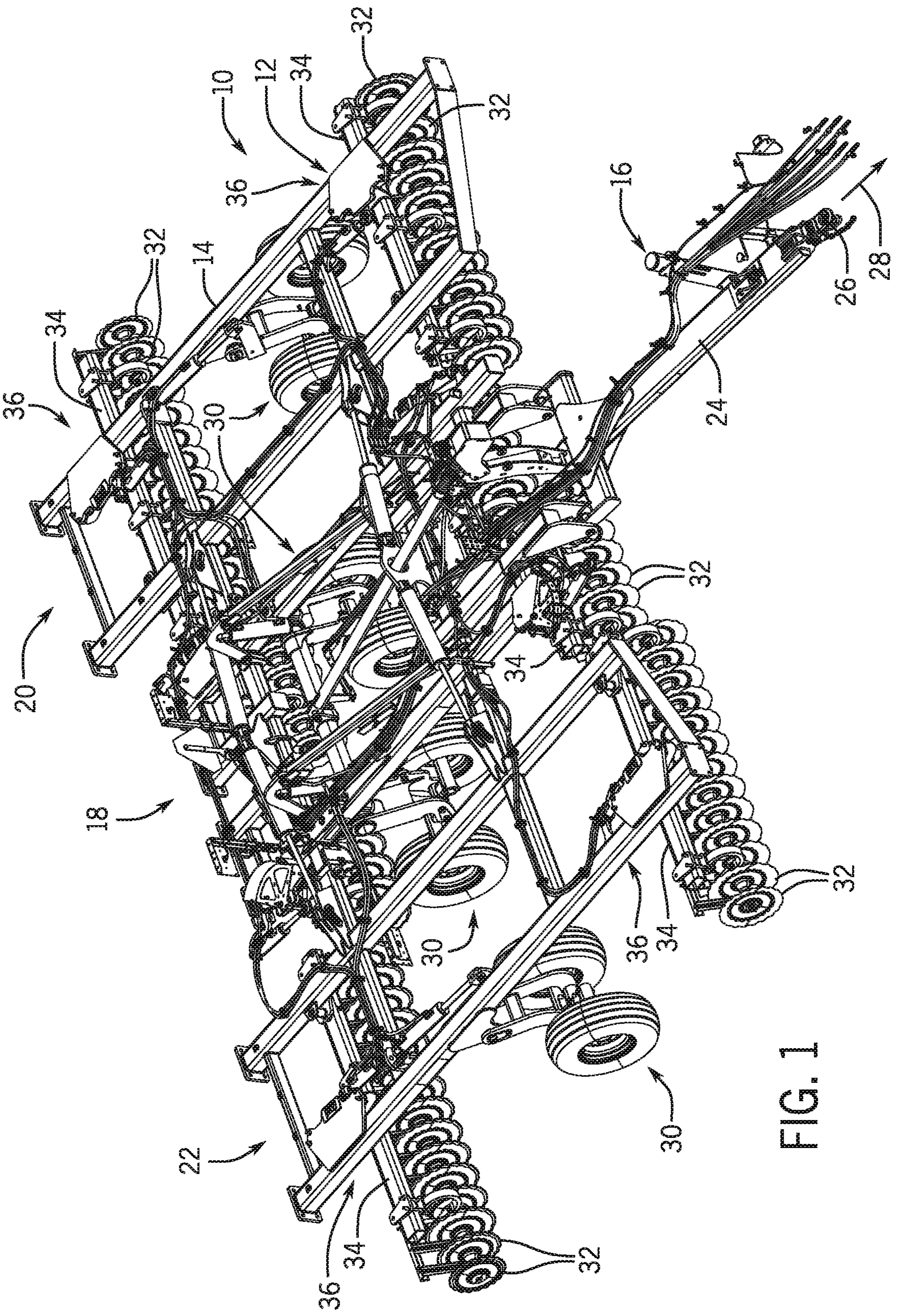
FIG. 1 is a perspective view of an embodiment of a tillage implement having a disc blade angle control system.

FIG. 1 is a perspective view of an embodiment of a tillage implement 10 (e.g., agricultural implement) having a disc blade angle control system 12. In the illustrated embodiment, the tillage implement 10 is a vertical tillage implement having multiple ground engaging tools configured to till soil. As illustrated, the tillage implement 10 includes a frame 14 and a hitch assembly 16 coupled to the frame 14. In the illustrated embodiment, the frame 14 includes a center section 18, a left wing section 20, and a right wing section 22. Each wing section is configured to rotate upwardly from the illustrated working position to a transport position to facilitate transport of the tillage implement 10. For example, one or more actuators (e.g., hydraulic cylinder(s), etc.) may be configured to drive each wing section to rotate between the illustrated working position and the transport position. While the frame 14 includes the center section 18, the left wing section 20, and the right wing section 22 in the illustrated embodiment, in other embodiments, the frame may include more or fewer sections. For example, in certain embodiments, the frame may be substantially rigid (e.g., not including any translatable and/or rotatable components). Furthermore, the frame 14 may be formed from multiple frame elements (e.g., rails, tubes, braces, etc.) coupled to one another (e.g., via welded connection(s), via fastener(s), etc.).

In the illustrated embodiment, the hitch assembly 16 includes a hitch frame 24 and a hitch 26. The hitch frame 24 is pivotally coupled to the implement frame 14 via pivot joint(s), and the hitch 26 is configured to couple to a corresponding hitch of a work vehicle (e.g., tractor), which is configured to tow the tillage implement 10 through a field along a direction of travel 28. While the hitch frame 24 is pivotally coupled to the implement frame 14 in the illustrated embodiment, in other embodiments, the hitch frame may be movably coupled to the implement frame by a linkage assembly (e.g., four bar linkage assembly, etc.) or another suitable assembly/mechanism that enables the hitch to move along a vertical axis relative to the implement frame, or the hitch frame may be rigidly coupled to the implement frame.

As illustrated, the tillage implement 10 includes wheel assemblies 30 movably coupled to the implement frame 14. In the illustrated embodiment, each wheel assembly 30 includes a wheel frame and a wheel rotatably coupled to the wheel frame. The wheels of the wheel assemblies 30 are configured to engage the surface of the soil, and the wheel assemblies 30 are configured to support at least a portion of the weight of the tillage implement 10. In the illustrated embodiment, each wheel frame is pivotally coupled to the implement frame 14, thereby facilitating adjustment of the vertical position of the respective wheel(s). However, in other embodiments, at least one wheel frame may be movably coupled to the implement frame by another suitable connection (e.g., sliding connection, linkage assembly, etc.) that facilitates adjustment of the vertical position of the respective wheel(s).

In the illustrated embodiment, the tillage implement 10 includes disc blades 32 configured to engage a top layer of the soil. As the tillage implement 10 is towed through the field, the disc blades 32 are driven to rotate, thereby breaking up the top layer of the soil. In the illustrated embodiment, the disc blades 32 are arranged in two rows. However, in other embodiments, the disc blades may be arranged in more or fewer rows (e.g., 1, 3, 4, 5, 6, or more). Furthermore, in the illustrated embodiment, each row of disc blades 32 includes four gangs of disc blades 32. Two gangs of disc blades of the front row are coupled to the center section 18, two gangs of disc blades of the rear row are coupled to the center section 18, one gang of disc blades of the front row is coupled to the left wing section 20, one gang of disc blades of the rear row is coupled to the left wing section 20, one gang of disc blades of the front row is coupled to the right wing section 22, and one gang of disc blades of the rear row is coupled to the right wing section 22. While the tillage implement 10 includes eight gangs of disc blades 32 in the illustrated embodiment, in other embodiments, the tillage implement may include more or fewer gangs of disc blades (e.g., 2, 4, 6, 10, or more). Furthermore, the gangs of disc blades may be arranged in any suitable configuration on the implement frame.

The disc blades 32 of each gang are non-rotatably coupled to one another by a respective shaft assembly, such that the disc blades 32 of each gang rotate together. Each shaft assembly is rotatably coupled to a respective disc blade support 34, which is configured to support the gang, including the shaft assembly and the disc blades 32. Furthermore, each disc blade support 34 is pivotally coupled to the frame 14 at a respective pivot point, thereby enabling the disc blade support 34 to rotate relative to the frame 14. Rotating the disc blade support 34 relative to the frame 14 controls the angle between the respective disc blades 32 and the direction of travel 28, thereby controlling the interaction of the disc blades 32 with the top layer of the soil. Each disc blade support 34 may include any suitable structure(s) configured to support the respective gang (e.g., including a square tube, a round tube, a bar, a truss, other suitable structure(s), or a combination thereof). While the disc blades 32 supported by each disc blade support 34 are arranged in a respective gang (e.g., non-rotatably coupled to one another by a respective shaft assembly) in the illustrated embodiment, in other embodiments, at least a portion of the disc blades supported by at least one disc blade support (e.g., all of the disc blades supported by the disc blade support) may be arranged in another suitable configuration (e.g., individually mounted and independently rotatable, mounted in groups and independently rotatable, etc.). For example, in certain embodiments, a first portion of the disc blades supported by a disc blade support may be arranged in a gang, and a second portion of the disc blades supported by the disc blade support may be individually mounted and independently rotatable.

In the illustrated embodiment, the rotation of each gang of disc blades 32 is controlled by a respective disc blade angle adjustment assembly 36 of the disc blade angle control system 12. As discussed in detail below, each disc blade angle adjustment assembly 36 includes an actuator configured to drive the respective disc blade support 34 to rotate about a vertical axis of the tillage implement 10, thereby driving each disc blade 32 of the respective gang to rotate about the vertical axis. Accordingly, the angle of each gang of disc blades 32 relative to the direction of travel 28 may be adjusted via the actuator of the respective disc blade angle adjustment assembly 36.

Furthermore, as discussed in detail below, the disc blade angle control system 12 of the tillage implement 10 includes a controller having a memory and a processor. The controller is configured to receive a signal indicative of a side load applied to a disc blade 32 (e.g., a gang of disc blades 32). The side load corresponds to a force applied to the disc blade 32 along an axis parallel to a rotational axis of the disc blade 32. In addition, the controller is configured to control an actuator (e.g., the actuator of the respective disc blade angle adjustment assembly 36) to adjust an angle of the disc blade 32 (e.g., relative to the direction of travel 28) based on the side load. For example, as the angle of the disc blade 32 relative to the direction of travel 28 increases, the degree of tillage may be enhanced. However, a large angle of the disc blade 32 relative to the direction of travel 28 may increase the load applied by a back side (e.g., convex side) of the disc blade 32 to the soil, which may result in compaction of the soil. The degree of compaction may increase as the angle of the disc blade 32 increases. In addition, the load applied to the back side (e.g., convex side) of the disc blade 32 by the soil may increase as the angle of the disc blade 32 increases. Accordingly, the side load monitored by the controller may be indicative of the degree of soil compaction caused by interaction between the back side (e.g., convex side) of the disc blade 32 and the soil. The controller may control the actuator to adjust the angle of the disc blade based on the side load to reduce compaction while maintaining a desired degree of tillage. For example, the controller may control the actuator to adjust the angle of the disc blade such that the side load is within a threshold range of a target side load. The target side load may be selected or determined to establish a compromise between degree of tillage and compaction. As a result, the effectiveness of the tilling operation may be enhanced.

While the tillage implement includes the disc blades 32 in the illustrated embodiment, in other embodiments, the tillage implement may include other/additional ground engaging tool(s) (e.g., coupled to the disc blade support(s), coupled to the frame of the tillage implement, etc.). For example, in certain embodiments, the tillage implement may include tillage point assemblies (e.g., positioned behind the disc blades relative to the direction of travel) configured to engage the soil at a greater depth than the disc blades, thereby breaking up a lower layer of the soil. Each tillage point assembly may include a tillage point and a shank. The shank may position the tillage point at a target depth beneath the soil surface, and the tillage point may break up the soil. The shape of each tillage point, the arrangement of the tillage point assemblies, and the number of tillage point assemblies may be selected to control tillage within the field. Furthermore, in certain embodiments, the tillage implement may include finishing discs (e.g., positioned behind the disc blades relative to the direction of travel). In such embodiments, as the tillage implement is towed through the field, the finishing discs may be driven to rotate, thereby sizing soil clods, leveling the soil surface, smoothing the soil surface, cutting residue on the soil surface, or a combination thereof. In addition, in certain embodiments, the tillage implement may include one or more other/additional suitable ground engaging tools, such as coulter(s), opener(s), tine(s), finishing reel(s), other suitable ground engaging tool(s), or a combination thereof. Furthermore, while the tillage implement 10 is a vertical tillage implement in the illustrated embodiment, in other embodiments, the tillage implement may be a primary tillage implement or another suitable type of tillage implement.

Figure 2:
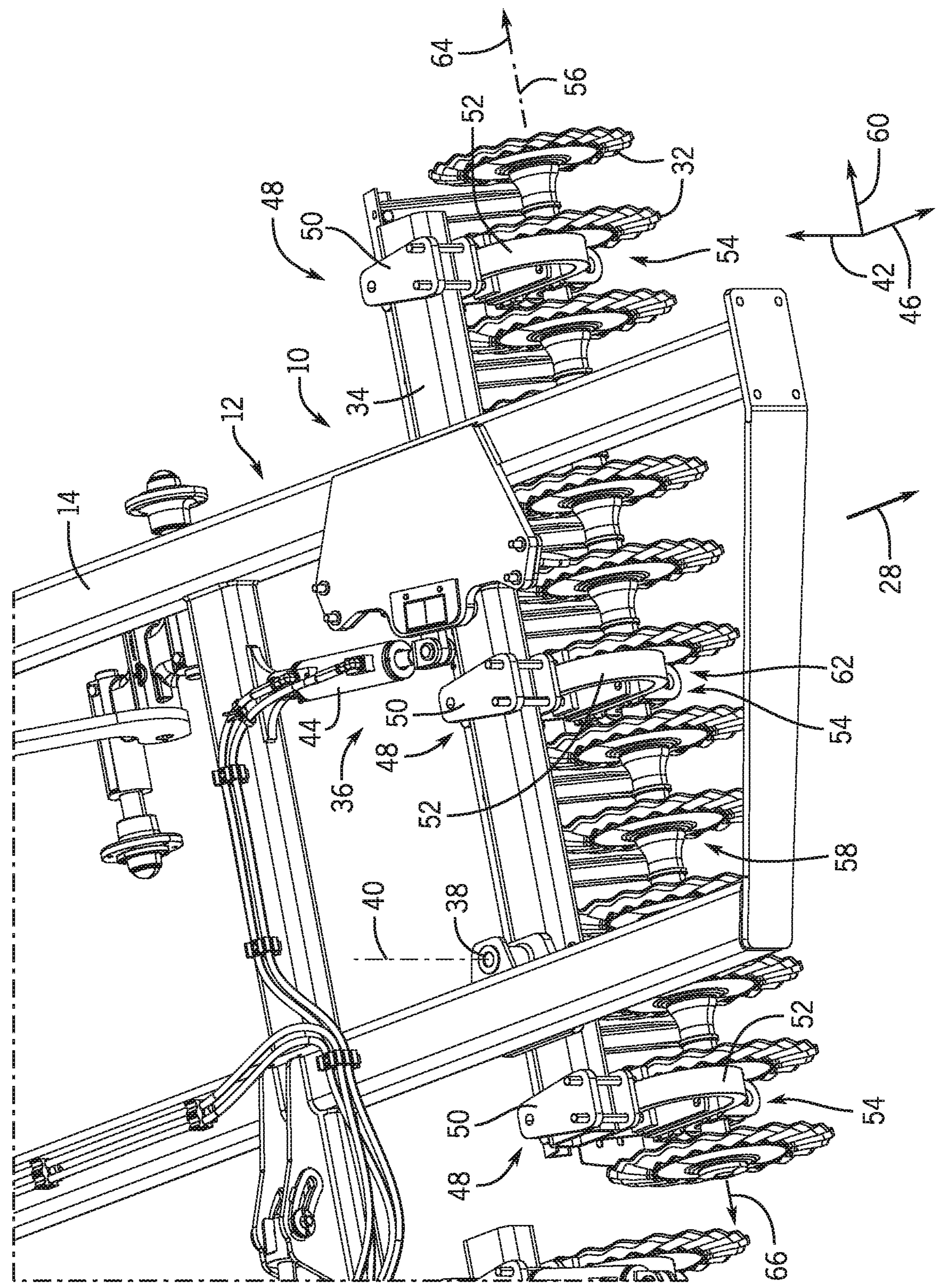
FIG. 2 is a perspective view of a portion of the tillage implement of FIG. 1.

FIG. 2 is a perspective view of a portion of the tillage implement of FIG. 1. As previously discussed, the disc blades 32 of the tillage implement 10 are supported by multiple disc blade supports 34, and each disc blade support 34 is pivotally coupled to the frame 14 at a respective pivot point 38. Each pivot point 38 may include any suitable structure(s) (e.g., shaft(s), bearing(s), bushing(s), etc.) configured to couple the respective disc blade support 34 to the frame 14 and to enable the disc blade support 34 to pivot about a pivot axis 40 relative to the frame 14. Furthermore, as previously discussed, rotating the disc blade support 34 relative to the frame 14 controls the angle between the respective disc blades 32 and the direction of travel 28, thereby controlling the interaction of the disc blades 32 with the top layer of the soil. In the illustrated embodiment, the pivot axis 40 extends along a vertical axis 42 of the tillage implement 10. Accordingly, rotation of the disc blade support 34 about the pivot point 38 causes the disc blades 32 to rotate about the vertical axis.

In the illustrated embodiment, the disc blade angle adjustment assembly 36 includes an actuator 44 (e.g., first actuator) coupled to the disc blade support 34 and to the frame 14 of the tillage implement 10. The actuator 44 is configured to drive the disc blade support 34 to rotate about the pivot point 38/pivot axis 40, thereby controlling the angle of the disc blades 32 relative to the direction of travel 28 (e.g., relative to a longitudinal axis 46 of the tillage implement 10). In the illustrated embodiment, the actuator 44 includes a hydraulic cylinder. However, in other embodiments, the actuator may include another suitable type of actuating device (e.g., alone or in combination with the hydraulic cylinder), such as a pneumatic cylinder, a hydraulic motor, a pneumatic motor, an electric motor, an electric linear actuator, other suitable type(s) of actuating device(s), or a combination thereof.

In the illustrated embodiment, the gang of disc blades 32 is coupled to the disc blade support 34 by three mounting assemblies 48. Each mounting assembly 48 includes a clamp 50, a spring 52, and a bearing assembly 54. As illustrated, each clamp 50 is coupled to the disc blade support 34. For example, in certain embodiments, the clamp 50 may include a first plate positioned above the disc blade support 34 (e.g., with respect to the vertical axis 42) and a second plate positioned below the disc blade support 34 (e.g., with respect to the vertical axis 42). The plates may be coupled to one another by fasteners (e.g., bolts, screws, etc.) that urge the plates toward one another, thereby capturing the disc blade support 34 between the plates, which couples the clamp 50 to the disc blade support 34.

Furthermore, the spring 52 (e.g., leaf spring, etc.) is coupled to the clamp 50 and to the bearing assembly 54. For example, in certain embodiments, the clamp 50 may include a third plate positioned below the second plate (e.g., with respect to the vertical axis 42). A first end of the spring 52 may be positioned between the second plate and the third plate (e.g., with respect to the vertical axis 42). The fasteners disclosed above may also couple the third plate to the second plate. Accordingly, the fasteners may urge the second and third plates toward one another, thereby capturing the first end of the spring 52 between the second and third plates, which couples the spring 52 to the disc blade support 34.

A second end of the spring 52 may be coupled to the bearing assembly 54 via a pivotal connection that enables the bearing assembly 54 to pivot about an axis perpendicular to a rotational axis 56 of the disc blades 32 (e.g., rotational axis of the gang of disc blades 32). In the illustrated embodiment, the disc blades 32 of the gang are non-rotatably coupled to one another by a shaft assembly 58. Accordingly, the disc blades 32 of the gang rotate together as the tillage implement 10 moves along the direction of travel 28 during tillage operations. The bearing assembly 54 is rotatably coupled to the shaft assembly 58, thereby enabling the gang of disc blades 32 to rotate about the rotational axis 56. In addition, the pivotal connection between the bearing assembly 54 and the spring 52 enables the shaft assembly 58 to flex during tillage operations. In certain embodiments, the angle of the disc blades 32 relative to the direction of travel may be represented as an angle of the rotational axis 56 relative to a lateral axis 60 of the tillage implement 10. For example, while the angle of the rotational axis 56 is aligned with the lateral axis 60, the angle of the disc blades 32 is zero, and the disc blades are aligned with the direction of travel 28.

While the gang of disc blades 32 is coupled to the disc blade support 34 by three mounting assemblies 48 in the illustrated embodiment, in other embodiments, the gang of disc blades may be coupled to the disc blade support by more or fewer mounting assemblies (e.g., 1, 2, 4, 5, 6, or more). Furthermore, each mounting assembly may include any suitable component(s) configured to mount the gang of disc blades to the disc blade support. For example, in certain embodiments, the first end of the spring of at least one mounting assembly may be coupled to the disc blade support by a fastener connection, a welded connection, an adhesive connection, other suitable type(s) of connection(s), or a combination thereof. Furthermore, in certain embodiments, the spring of at least one mounting assembly may be omitted. For example, the clamp may be coupled to the bearing assembly by a rigid element/assembly, the clamp may be coupled to the bearing assembly by a cylinder (e.g., hydraulic cylinder, pneumatic cylinder, etc.), or the clamp may be coupled to the bearing assembly by a resilient (e.g., compressible) element. In addition, in certain embodiments, the bearing assembly may be non-pivotally coupled to the spring, the rigid element/assembly, the resilient element, or the cylinder. While the structure and alternative configurations of the mounting assemblies are disclosed above with reference to one gang of disc blades, the structure and alternative configurations may apply to the mounting assemblies for the other gangs of disc blades throughout the tillage implement.

As discussed in detail below, the disc blade angle control system 12 includes a sensor system 62 configured to output signal(s) indicative of a side load applied to the disc blades 32. In certain embodiments, the sensor system 62 may include first load cells, in which each first load cell is positioned between a front side (e.g., concave side) of a respective disc blade 32 and a bearing of a respective bearing assembly 54. Accordingly, the first load cells may monitor the force applied by the gang of disc blades to the bearings along the rotational axis 56 of the disc blades 32. For example, the first load cells may monitor a compression load in response to a force applied to the disc blades 32 by the soil in a first direction 64 along an axis parallel to the rotational axis 56. Additionally or alternatively, the first load cells may monitor an expansion load in response to a force applied to the disc blades 32 by the soil in a second direction 66 along the axis parallel to the rotational axis 56. Accordingly, the first load cells may output signals indicative of the side load applied to the disc blades 32. As previously discussed, the side load corresponds to the force applied to the disc blades 32 along the axis parallel to the rotational axis 56. In certain embodiments, the number of first load cells is equal to the number of mounting assemblies. Accordingly, the side load applied to the disc blades 32 of the gang may be monitored (e.g., by summing the loads monitored by the first load cells). Furthermore, in certain embodiments, the sensor system may include a single first load cell, and the side load applied to the disc blades 32 may be determined based on feedback from the single first load cell (e.g., by multiplying the load monitored by the first load cell by the number of mounting assemblies).

Furthermore, in certain embodiments, the sensor system 62 may include second load cells, in which each second load cell is positioned between a back side (e.g., convex side) of a respective disc blade 32 and a bearing of a respective bearing assembly 54. Accordingly, the second load cells may monitor the force applied by the gang of disc blades to the bearings along the rotational axis 56 of the disc blades 32. For example, the second load cells may monitor a compression load in response to a force applied to the disc blades 32 by the soil in the second direction 66 along the axis parallel to the rotational axis 56. Additionally or alternatively, the second load cells may monitor an expansion load in response to a force applied to the disc blades 32 by the soil in the first direction 64 along the axis parallel to the rotational axis 56. Accordingly, the second load cells may output signals indicative of the side load applied to the disc blades 32. As previously discussed, the side load corresponds to the force applied to the disc blades 32 along the axis parallel to the rotational axis 56. In certain embodiments, the number of second load cells is equal to the number of mounting assemblies. Accordingly, the side load applied to the disc blades 32 of the gang may be monitored (e.g., by summing the loads monitored by the second load cells). Furthermore, in certain embodiments, the sensor system may include a single second load cell, and the side load applied to the disc blades 32 may be determined based on feedback from the single second load cell (e.g., by multiplying the load monitored by the second load cell by the number of mounting assemblies). In certain embodiments, the sensor system 62 may include only first load cells, only second load cells, or a combination of first and second load cells.

While load cell(s) are disclosed above, the sensor system may include other suitable sensor(s) (e.g., alone or in combination with the load cell(s)), in which each sensor is configured to output a respective signal indicative of the side load applied to the disc blades. For example, in certain embodiments, the sensor system may include strain gauge(s) coupled to the spring(s) of the mounting assembly/assemblies. Each strain gauge may be oriented to monitor deflection of the respective spring with respect to the rotational axis of the disc blades. Accordingly, each strain gauge may output a respective signal indicative of the side load applied to the disc blades. In certain embodiments, the number of strain gauges may be equal to the number of mounting assemblies. Accordingly, the side load applied to the disc blades of the gang may be monitored (e.g., by summing the loads monitored by the strain gauges). Furthermore, in certain embodiments, the sensor system may include a single strain gauge, and the side load applied to the disc blades may be determined based on feedback from the single strain gauge (e.g., by multiplying the load monitored by the strain gauge by the number of mounting assemblies).

In certain embodiments, the sensor system may include pressure sensor(s) coupled to respective disc blade(s). For example, pressure sensor(s) may be coupled to the back side(s) (e.g., convex side(s)) of respective disc blade(s), and/or pressure sensor(s) may be coupled to the front side(s) (e.g., concave side(s)) of respective disc blade(s). Each pressure sensor may directly monitor the force applied to the respective disc blade by the soil along the axis parallel to the rotational axis of the disc blade. Accordingly, each pressure sensor may output a signal indicative of the side load applied to the disc blade. For example, a pressure sensor coupled to the back side (e.g., convex side) of a disc blade may output a signal indicative of the side load applied to the disc blade in the first direction, and a pressure sensor coupled to the front side (e.g., concave side) of a disc blade may output a signal indicative of the side load applied to the disc blade in the second direction. In certain embodiments, with regard to determining the side load in each direction, the number of pressure sensors may be equal to the number of disc blades. Accordingly, the side load applied to the disc blades of the gang may be monitored (e.g., by summing the loads monitored by the pressure sensors). For example, the side load in one direction may be monitored by a number of pressure sensors equal to the number of disc blades, and the side load in both directions may be monitored by a number of pressure sensors equal to twice the number of disc blades. Furthermore, in certain embodiments, with regard to determining the side load in each direction, the sensor system may include a single pressure sensor, and the side load applied to the disc blades may be determined based on feedback from the single pressure sensor (e.g., by multiplying the load monitored by the pressure sensor by the number of disc blades). For example, the side load in one direction may be monitored by a single pressure sensor, and the side load in both directions may be monitored by two pressure sensors. While various numbers and types of sensors are disclosed above, the sensor system may include any suitable number of sensors and any suitable type(s) of sensor(s) for monitoring the side load applied to the disc blades.

As discussed in detail below, the disc blade angle control system 12 includes a controller communicatively coupled to the sensor system 62 and to the actuator 44. The controller is configured to receive the signal(s) from the sensor system 62, and the controller is configured to control the actuator 44 to adjust the angle of the disc blades 32 relative to the direction of travel 28 based on the side load. For example, as the angle of the disc blades 32 relative to the direction of travel 28 increases, the degree of tillage may be enhanced. However, a large angle of the disc blades 32 relative to the direction of travel 28 may increase the load applied by the back side (e.g., convex side) of each disc blade 32 to the soil, which may result in compaction of the soil. The degree of compaction may increase as the angle of the disc blades 32 increases. In addition, the load applied to the back side (e.g., convex side) of each disc blade 32 by the soil may increase as the angle of the disc blade 32 increases. In certain embodiments, the side load monitored by the controller in the first direction 64 may be indicative of the degree of soil compaction caused by interaction between the back side (e.g., convex side) of each disc blade 32 and the soil. The controller may control the actuator 44 to adjust the angle of the disc blades based on the side load in the first direction 64 to reduce compaction while maintaining a desired degree of tillage. For example, the controller may control the actuator 44 to adjust the angle of the disc blades such that the side load is within a threshold range of a target side load. The target side load may be selected or determined to establish a compromise between degree of tillage and compaction. As a result, the effectiveness of the tilling operation may be enhanced.

While the disc blade angle control system is disclosed above with reference to one gang of disc blades, the disc blade angle control system may control the angle(s) of other disc blade(s) of the tillage implement. For example, in certain embodiments, the disc blade angle control system includes a second sensor system and a second actuator. The second sensor system is configured to output a second signal indicative of a second side load applied to a second gang of disc blades. Each disc blade of the second gang of disc blades is configured to engage the soil, and the second side load corresponds to a second force applied to the second gang of disc blades along a second axis parallel to a second rotational axis of the second gang of disc blades. Furthermore, the second actuator is configured to adjust a second angle of the disc blades relative to the direction of travel. The controller is communicatively coupled to the second sensor system and to the second actuator, and the controller is configured to receive the second signal from the second sensor system. Furthermore, the controller is configured to control the second actuator, independently of the actuator (e.g., first actuator) disclosed above, to adjust the second angle of the second gang of disc blades based on the second side load. All of the features, functions, and variations disclosed above with regard to the first gang/sensor system/actuator may apply to the second gang/sensor system/actuator.

Figure 3:
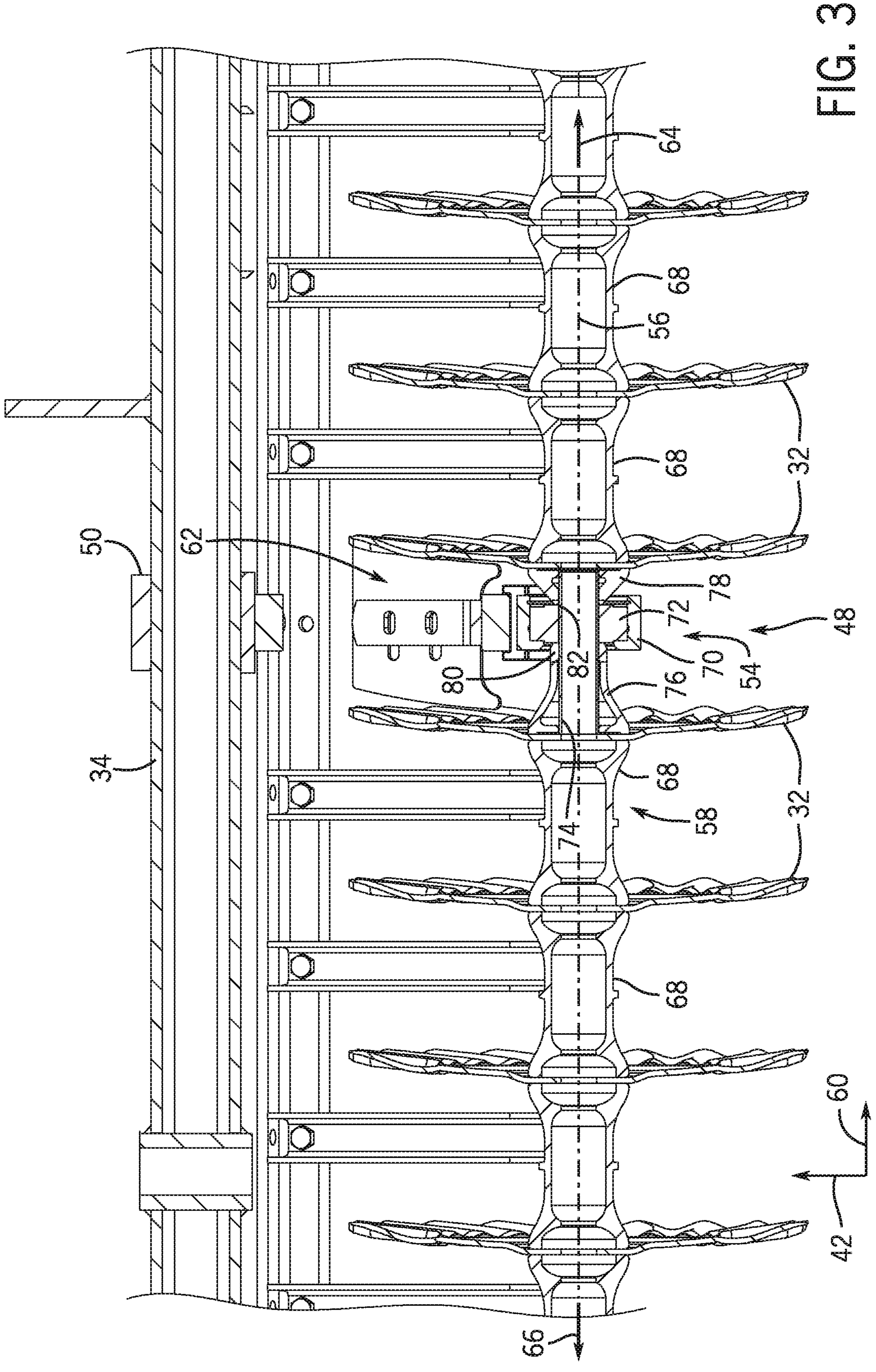
FIG. 3 is a cross-sectional view of a portion of a gang of disc blades of the tillage implement of FIG. 1.

FIG. 3 is a cross-sectional view of a portion of a gang of disc blades 32 of the tillage implement of FIG. 1. As previously discussed, the disc blades 32 of the gang are non-rotatably coupled to one another by the shaft assembly 58. Accordingly, the disc blades 32 of the gang rotate together as the tillage implement 10 moves along the direction of travel during tillage operations. In the illustrated embodiment, the shaft assembly 58 is formed from multiple shaft segments 68 that are non-rotatably coupled to one another. Each disc blade 32 is non-rotatably coupled to at least one shaft segment 68, thereby forming the gang of disc blades 32.

Furthermore, as previously discussed, the bearing assembly 54 is rotatably coupled to the shaft assembly 58, thereby enabling the gang of disc blades 32 to rotate about the rotational axis 56. In the illustrated embodiment, the bearing assembly 54 includes a housing 70 and a bearing 72. The housing 70 is pivotally coupled to the spring, and the bearing 72 is disposed within the housing 70. A shaft 74 of the shaft assembly 58 extends through the bearing 72, thereby facilitating rotation of the gang of disc blades 32. The shaft 74 is non-rotatably coupled to shaft segments 68 positioned on opposite sides of the bearing assembly 54. In addition, the shaft assembly 58 includes a first collar 76 and a second collar 78. The first collar 76 is positioned on a first side of the bearing 72, and the second collar 78 is positioned on a second side of the bearing 72, opposite the first side. The collars extend about the shaft 74 and control the position of the disc blades 32 relative to the bearing 72 along the rotational axis 56 of the gang. The other bearing assemblies may have the same structure as the illustrated bearing assembly, and the shaft assembly may include respective shafts and collars for the other bearing assemblies, in which each shaft and pair of collars has the same structure as the illustrated shaft/collars.

In the illustrated embodiment, the sensor system 62 includes first load cell(s) 80. Each first load cell 80 is positioned between a front side (e.g., concave side) of a respective disc blade 32 and the bearing 72 of a respective bearing assembly 54. In the illustrated embodiment, each first load cell 80 is positioned between a respective first collar 76 and a respective bearing 72. However, in other embodiments, at least one first load cell may be positioned between a respective disc blade and a respective first collar, and/or at least one first load cell may be positioned between a respective disc blade and a respective shaft segment. As previously discussed, the first load cell(s) 80 may monitor the force applied by the gang of disc blades 32 to the bearing(s) 72 along the rotational axis 56 of the disc blades 32. For example, the first load cell(s) 80 may monitor a compression load in response to a force applied to the disc blades 32 by the soil in the first direction 64 along the axis parallel to the rotational axis 56. Additionally or alternatively, the first load cell(s) 80 may monitor an expansion load in response to a force applied to the disc blades 32 by the soil in the second direction 66 along the axis parallel to the rotational axis 56. Accordingly, the first load cell(s) may output signal(s) indicative of the side load applied to the disc blades 32. As previously discussed, the side load corresponds to the force applied to the disc blades 32 (e.g., by the soil) along the axis parallel to the rotational axis 56.

In the illustrated embodiment, the sensor system 62 includes second load cell(s) 82. Each second load cell 82 is positioned between a back side (e.g., convex side) of a respective disc blade 32 and the bearing 72 of a respective bearing assembly 54. In the illustrated embodiment, each second load cell 82 is positioned between a respective second collar 78 and a respective bearing 72. However, in other embodiments, at least one second load cell may be positioned between a respective disc blade and a respective second collar, and/or at least one second load cell may be positioned between a respective disc blade and a respective shaft segment. As previously discussed, the second load cell(s) 82 may monitor the force applied by the gang of disc blades 32 to the bearing(s) 72 along the rotational axis 56 of the disc blades 32. For example, the second load cell(s) 82 may monitor a compression load in response to a force applied to the disc blades 32 by the soil in the second direction 66 along the axis parallel to the rotational axis 56. Additionally or alternatively, the second load cell(s) 82 may monitor an expansion load in response to a force applied to the disc blades 32 by the soil in the first direction 64 along the axis parallel to the rotational axis 56. Accordingly, the second load cell(s) may output signal(s) indicative of the side load applied to the disc blades 32. As previously discussed, the side load corresponds to the force applied to the disc blades 32 (e.g., by the soil) along the axis parallel to the rotational axis 56. While the sensor system 62 includes first load cells 80 and second load cells 82 in the illustrated embodiment, in other embodiments, the sensor system may include only first load cell(s) or only second load cell(s). Furthermore, in certain embodiments, the sensor system may include other suitable sensor(s) (e.g., alone or in combination with the load cell(s)). In addition, while the shaft assembly is formed by segments, collars, and shaft(s) in the illustrated embodiment, in other embodiments, the shaft assembly may be formed from any other suitable component(s) (e.g., a single shaft extending along the length of the gang, etc.).

As previously discussed, the disc blade angle control system 12 includes a controller communicatively coupled to the sensor system 62 and to the actuator. The controller is configured to receive the signal(s) from the sensor system 62, and the controller is configured to control the respective actuator to adjust the angle of the disc blades 32 relative to the direction of travel 28 based on the side load. For example, as the angle of the disc blades 32 relative to the direction of travel 28 increases, the degree of tillage may be enhanced. However, a large angle of the disc blades 32 relative to the direction of travel 28 may increase the load applied by the back side (e.g., convex side) of each disc blade 32 to the soil, which may result in compaction of the soil. The degree of compaction may increase as the angle of the disc blades 32 increases. In addition, the load applied to the back side (e.g., convex side) of each disc blade 32 by the soil may increase as the angle of the disc blade 32 increases.

In certain embodiments, the side load monitored by the controller in the first direction 64 may be indicative of the degree of soil compaction caused by interaction between the back side (e.g., convex side) of each disc blade 32 and the soil. The controller may control the respective actuator to adjust the angle of the disc blades based on the side load in the first direction 64 to reduce compaction while maintaining a desired degree of tillage. Furthermore, in certain embodiments, the side load monitored by the controller in the second direction 66 may be indicative of the degree of soil compaction caused by the interaction between the back side (e.g., convex side) of each disc blade 32 and the soil. For example, during operation of the tillage implement, interaction between the disc blades 32 and the soil may cause a force to be applied to the front side (e.g., concave side) of each disc blade 32 along the axis parallel to the rotational axis of the disc blade 32, thereby establishing a side load in the second direction. As the angle of the disc blades 32 relative to the direction of travel 28 increases, the force applied to the back side (e.g., convex side) of each disc blade 32 may increase, thereby reducing the side load in the second direction 66. As such, a decrease in the side load in the second direction 66 may be indicative of the degree of soil compaction caused by interaction between the back side (e.g., convex side) of each disc blade 32 and the soil. Accordingly, the controller may control the respective actuator to adjust the angle of the disc blades based on the side load in the second direction 66 to reduce compaction while maintaining a desired degree of tillage.

While soil compaction caused by interaction between the back side (e.g., convex side) of each disc blade and the soil is disclosed above, in certain embodiments, soil compaction may also be cause by interaction between the front side (e.g., concave side) of the disc blade and the soil. For example, as previously discussed, during operation of the tillage implement, interaction between the disc blades 32 and the soil may cause a force to be applied to the front side (e.g., concave side) of each disc blade 32 along the axis parallel to the rotational axis of the disc blade 32. Based on the angle of the disc blades, the force between the front side (e.g., concave side) of each disc blade 32 and the soil may cause compaction. Accordingly, in certain embodiments, the controller may control the respective actuator to adjust the angle of the disc blades based on the side load in the second direction 66 to reduce compaction.

The controller may control the respective actuator to adjust the angle of the disc blades such that the side load (e.g., in the first direction 64 or in the second direction 66) is within a threshold range of a target side load. The target side load may be selected or determined to establish a compromise between degree of tillage and compaction, thereby enhancing the effectiveness of the tilling operation. In certain embodiments, the controller may determine the target side load via machine learning, as discussed in detail below.

While the tillage implement includes fluted concave disc blades in the illustrated embodiment, in other embodiments, the tillage implement may include other suitable type(s) of disc blades (e.g., alone or in combination with the fluted concave disc blades), such as straight disc blades, straight fluted disc blades, concave disc blades, notched disc blades, other suitable type(s) of disc blades, or a combination thereof. In addition, while monitoring the side load and controlling the angle of disc blades on a tillage implement is disclosed above, the disc blade angle control system disclosed herein may be used to monitor the side load and control the angle of disc blade(s) on other suitable implements/tools. For example, the disc blade angle control system may be employed within a seeder, a planter, a primary tillage implement, a fertilizer applicator, or another suitable implement/tool for monitoring the side load and controlling the angle of one or more disc blades. Furthermore, in certain embodiments, the disc blade angle control system may monitor the side load and control the angle of an individually mounted disc blade, such as a coulter, an opener disc, a closing disc, etc.

Figure 4:
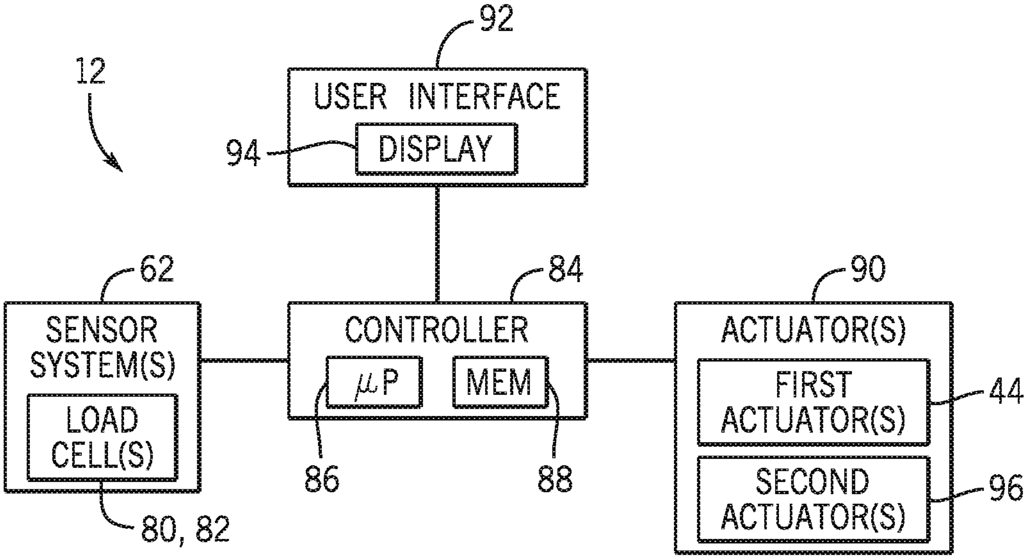
FIG. 4 is a block diagram of an embodiment of a disc blade angle control system that may be employed within the tillage implement of FIG. 1.

FIG. 4 is a block diagram of an embodiment of a disc blade angle control system 12 that may be employed within the tillage implement of FIG. 1. In the illustrated embodiment, the disc blade angle control system 12 includes a controller 84 configured to control actuator(s) to adjust angle(s) of disc blade(s) based on side load(s) applied to the disc blade(s). In certain embodiments, the controller 84 is an electronic controller having electrical circuitry configured to receive signal(s) from the sensor system(s) 62 indicative of side load(s) applied to disc blade(s). In the illustrated embodiment, the controller 84 includes a processor, such as the illustrated microprocessor 86, and a memory device 88. The controller 84 may also include one or more storage devices and/or other suitable components. The processor 86 may be used to execute software, such as software for controlling actuator(s) 90, and so forth. Moreover, the processor 86 may include multiple microprocessors, one or more "general-purpose" microprocessors, one or more special-purpose microprocessors, and/or one or more application specific integrated circuits (ASICs), or some combination thereof. For example, the processor 86 may include one or more reduced instruction set (RISC) processors.

The memory device 88 may include a volatile memory, such as random access memory (RAM), and/or a nonvolatile memory, such as read-only memory (ROM). The memory device 88 may store a variety of information and may be used for various purposes. For example, the memory device 88 may store processor-executable instructions (e.g., firmware or software) for the processor 86 to execute, such as instructions for controlling the actuator(s) 90, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the actuator(s) 90, etc.), and any other suitable data.

In the illustrated embodiment, the disc blade angle control system 12 includes a user interface 92 communicatively coupled to the controller 84. The user interface 92 is configured to receive input from an operator and to provide information to the operator. The user interface 92 may include any suitable input device(s) for receiving input, such as a keyboard, a mouse, button(s), switch(es), knob(s), other suitable input device(s), or a combination thereof. In addition, the user interface 92 may include any suitable output device(s) for presenting information to the operator, such as speaker(s), indicator light(s), other suitable output device(s), or a combination thereof. In the illustrated embodiment, the user interface 92 includes a display 94 configured to present visual information to the operator. In certain embodiments, the display 94 may include a touchscreen interface configured to receive input from the operator.

In the illustrated embodiment, the controller 84 is configured to receive signal(s) indicative of side load(s) applied to disc blade(s) of an agricultural implement. As previously discussed, the disc blade(s) are configured to engage soil, and each side load corresponds to a force applied to respective disc blade(s) along an axis parallel to a rotational axis of the respective disc blade(s). In certain embodiments, the controller 84 is configured to receive the signal(s) from the sensor system(s) 62. As previously discussed, the sensor system(s) 62 are configured to output the signal(s) indicative of the side load(s) applied to the disc blade(s). In certain embodiments, each sensor system 62 may include one or more load cells, such as the first load cell(s) 80 and/or the second load cell(s) 82 disclosed above. Furthermore, in certain embodiments, at least one sensor system may include strain gauge(s), pressure sensor(s), other suitable sensor(s), or a combination thereof (e.g., alone or in combination with the load cell(s)).

In certain embodiments, the controller 84 is configured to determine the side load(s) based on the signal(s) from the sensor system(s) 62. In such embodiments, the controller 84 may output signal(s) to the user interface 92 indicative of the side load(s), and the user interface 92 may present representation(s) of the side load(s) (e.g., numerical representation(s), graphical representation(s), etc.) to the operator (e.g., via the display 94). Furthermore, the controller 84 is configured to control the actuator(s) 90 to adjust angle(s) of the disc blade(s) based on the side load(s). For example, as previously discussed, the controller 84 may control the first actuator(s) 44 to adjust the angle(s) of the disc blade(s) relative to the direction of travel of the agricultural implement based on the side load(s) to reduce compaction while maintaining a desired degree of tillage.

In the illustrated embodiment, the actuator(s) 90 include one or more second actuators 96. Each second actuator 96 is configured to adjust an angle (e.g., second angle) of one or more respective disc blades relative to a horizontal plane of the agricultural implement. The horizontal plane extends through the frame of the agricultural implement. In certain embodiments, the horizontal plane of the agricultural implement is parallel to the surface of the field (e.g., while the frame of the agricultural implement is parallel to the surface of the field). With regard to an individually mounted disc blade, the second actuator may drive a disc blade support to rotate relative to the frame, thereby adjusting the angle of the disc blade relative to the horizontal plane. Furthermore, with regard to disc blades mounted in a gang, the second actuator may drive the disc blades of the gang to rotate relative to the rotational axis, thereby adjusting the angle of the disc blades relative to the horizontal plane.

In certain embodiments, the actuators 90 include a combination of first actuator(s) 44 and second actuator(s) 96. For example, a first actuator 44 and a second actuator 96 may be configured to drive an individually mounted disc blade or disc blades of a gang to rotate relative to the direction of travel and relative to the horizontal plane of the agricultural implement. Furthermore, in certain embodiments, first actuator(s) may drive one or more disc blades to rotate relative to the direction of travel, and second actuator(s) may drive one or more other disc blades to rotate relative to the horizontal plane of the agricultural implement. In addition, in certain embodiments, the actuator(s) 90 of the agricultural implement may only include first actuator(s) 44, or the actuator(s) 90 of the agricultural implement may only include second actuator(s) 96. Furthermore, in certain embodiments, a single actuator may be configured to rotate one or more disc blades relative to the direction of travel and relative to the horizontal plane of the agricultural implement.

The controller 84 may control the actuator(s) 90 (e.g., the first actuator(s) 44 and/or the second actuator(s) 96) to adjust the angle of the disc blade(s) such that the side load (e.g., in the first direction or in the second direction) is within a threshold range of a target side load. The threshold range may be established by minimum/maximum threshold values or by a threshold percentage of the target side load (e.g., within 10 percent of the target side load, within 5 percent of the target side load, within 2 percent of the target side load, within 1 percent of the target side load, etc.). The target side load may be selected or determined to establish a compromise between degree of tillage and compaction, thereby enhancing the effectiveness of the tilling operation. In certain embodiments, the target side load may be input to the user interface 92 and/or stored within the memory device 88 of the controller 84. Furthermore, in certain embodiments, the controller 84 may determine the target side load based on the penetration depth of the disc blade(s) into the soil, the speed of the agricultural implement along the direction of travel, soil condition(s) (e.g., based on feedback from soil sensor(s), via data input into the user interface, etc.), other suitable parameter(s), or a combination thereof. The soil condition(s) may include moisture content, organic content, composition, density, other suitable parameter(s), or a combination thereof.

In addition, in certain embodiments, the controller may determine the target side load via machine learning. For example, during operation, the controller may store the monitored side load in the memory as the agricultural implement moves along the direction of travel. After the agricultural operation (e.g., tillage operation) is complete, the operator may input data indicative of the quality of the agricultural operation. For example, with regard to a tillage operation, the operator may input data indicative of tillage quality and/or soil compaction. Furthermore, in certain embodiments, the controller may receive data indicative of the quality of the agricultural operation from one or more sensor(s) (e.g., soil compaction sensor(s), optical sensor(s), etc.). The monitored side loads and the data indicative of the quality of the agricultural operation may be used (e.g., by the controller) to train a machine learning process (e.g., stored within the controller). Furthermore, in certain embodiments, the monitored side loads and the data indicative of the quality of the agricultural operation may be received from multiple agricultural implements and used (e.g., by the controller) to train a machine learning process (e.g., stored within the controller). The controller may then determine a target side load that establishes a compromise between degree of tillage and compaction using the machine learning process. Furthermore, in certain embodiments, the controller may determine the threshold range via machine learning.

In certain embodiments (e.g., in embodiments in which the disc blade angle control system includes multiple actuators), the controller 84 is configured to control each actuator based on the side load applied to the disc blade(s) actuated by the actuator. Accordingly, certain disc blade(s) of the agricultural implement may be oriented at different angle(s) than other disc blade(s) of the agricultural implement. However, in other embodiments (e.g., in embodiments in which the disc blade angle control system includes multiple actuators), the controller may determine a single angle for the disc blades of the agricultural implement based on the side loads (e.g., based on an average of the side loads, based on the maximum side load, based on the minimum side load, etc.). Accordingly, all of the blades of the agricultural implement may be oriented at the same angle. Furthermore, while controlling the actuator(s) to adjust the angle(s) of the disc blade(s) such that the side load(s) are within a threshold range of a target side load is disclosed above, in certain embodiments, the controller may control the actuator(s) to adjust the angle(s) of the disc blade(s) such that the side load(s) are less than a maximum side load, based on a side load/disc blade angle table, etc.

Furthermore, in certain embodiments, the controller 84 may control the actuator(s) 90 (e.g., the first actuator(s) 44 and/or the second actuator(s) 96) to adjust the angle(s) of the disc blade(s) (e.g., relative to the direction of travel and/or relative to the horizontal plane) based on other suitable parameter(s) (e.g., alone or in combination with the side load(s)). For example, in certain embodiments, the controller 84 may control the angle of at least one disc blade (e.g., at least one gang of disc blades) based on an amount of residue on the surface of the soil/field. In such embodiments, the controller may receive signal(s) from residue sensor(s) (e.g., optical sensor(s), LIDAR sensor(s), etc.) of the agricultural implement (e.g., tillage implement) indicative of an amount of residue on the surface of the soil/field along the direction of travel of the agricultural implement (e.g., tillage implement). Additionally or alternatively, the controller may receive signal(s) from residue sensor(s) of a remote vehicle (e.g., aerial vehicle, ground vehicle, etc.) indicative of an amount of residue on the surface of the soil/field. Furthermore, in certain embodiments, the controller may store a residue map indicative of an amount of residue throughout the field (e.g., generated by a harvester controller during harvesting operations, etc.). In certain embodiments, the controller 84 may control a second actuator 96 to adjust the angle of a disc blade relative to the horizontal plane of the agricultural implement (e.g., tillage implement) based on the amount of residue on the surface of the field (e.g., alone or in combination with the side load). While an amount of residue on the surface of the field is disclosed above, the controller may control the actuator(s) (e.g., the first actuator(s) and/or the second actuator(s)) to adjust the angle(s) of the disc blade(s) (e.g., relative to the direction of travel and/or relative to the horizontal plane) based on a moisture content of the soil, a density of the soil, organic content of the soil, composition of the soil, size of the residue, other suitable parameter(s), or a combination thereof (e.g., alone or in combination with the amount of residue and/or the side load(s)).

Figure 5:
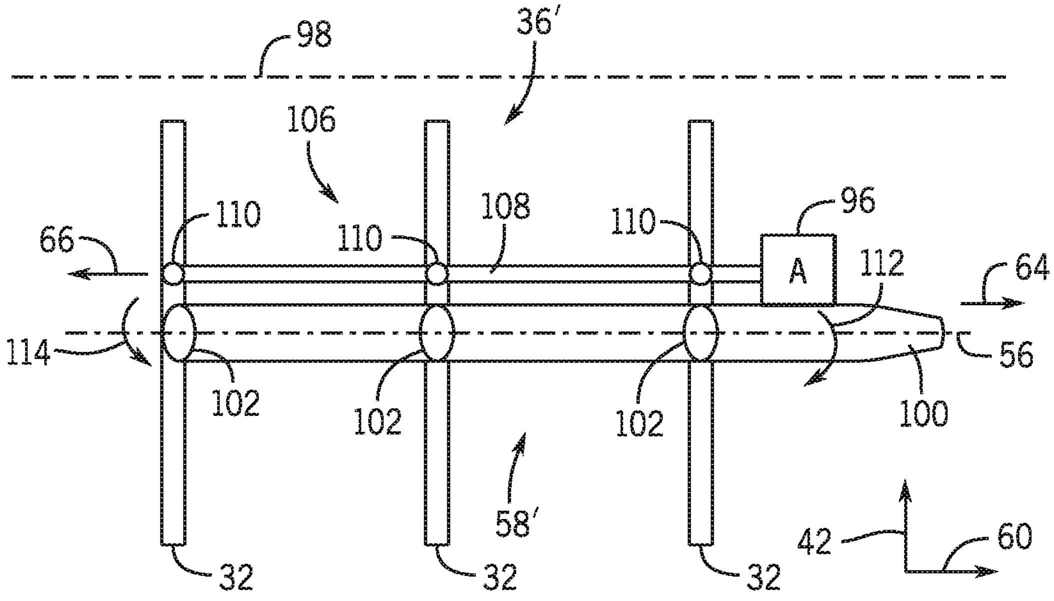
FIG. 5 is a schematic diagram of an embodiment of a disc blade angle adjustment assembly that may be employed within the tillage implement of FIG. 1.

FIG. 5 is a schematic diagram of an embodiment of a disc blade angle adjustment assembly 36' that may be employed within the tillage implement of FIG. 1. The disc blade angle adjustment assembly 36' may be employed within the disc blade angle control system disclosed above with reference to FIGS. 1-4 or within another suitable disc blade angle control system. As discussed in detail below, the disc blade angle adjustment assembly 36' is configured to adjust the angle of the disc blade(s) 32 relative to the horizontal plane 98 of the tillage implement (e.g., agricultural implement). As previously discussed, the horizontal plane 98 extends through the frame of the tillage implement (e.g., agricultural implement). In certain embodiments, the horizontal plane of the tillage implement (e.g., agricultural implement) is parallel to the surface of the field (e.g., while the frame of the tillage/agricultural implement is parallel to the surface of the field).

In the illustrated embodiment, the tillage implement includes a gang of disc blades 32. As previously discussed, each disc blade 32 of the gang is configured to engage the soil and to break up a top layer of the soil, thereby tilling the soil as the tillage implement moves through the field along the direction of travel. Furthermore, in the illustrated embodiment, the disc blades 32 of the gang are non-rotatably coupled to one another by a shaft assembly 58'. Accordingly, the disc blades 32 of the gang rotate together as the tillage implement moves along the direction of travel during tillage operations. In addition, one or more mounting assemblies, such as the mounting assemblies disclosed above with reference to FIG. 2, may rotatably support the shaft assembly 58' on the disc blade support. In the illustrated embodiment, the shaft assembly 58' includes a single shaft 100. However, in other embodiments, the shaft assembly may be formed from any other suitable component(s), such as the segments, collars, and shaft(s) disclosed above with reference to FIG. 3.

Each disc blade 32 is non-rotatably coupled to the shaft assembly 58', such that the disc blades 32 of the gang rotate together. Furthermore, in the illustrated embodiment, each disc blade 32 of the gang is pivotally coupled to the shaft assembly 58' by a respective pivot joint 102. Each pivot joint 102 is configured to block rotation of the respective disc blade 32 relative to the shaft assembly 58' about the rotational axis 56. In addition, each pivot joint 102 is configured to enable the respective disc blade 32 to pivot relative to the horizontal plane 98 of the tillage implement. Accordingly, in the illustrated embodiment, each disc blade 32 may pivot about a respective pivot joint 102 relative to the rotational axis 56 of the gang of disc blades 32.

The disc blade angle adjustment assembly 36' is configured to adjust the angle of each disc blade 32 of the gang relative to the horizontal plane 98 of the tillage implement (e.g., as compared to the disc blade angle adjustment assembly disclosed above with reference to FIG. 2, which is configured to adjust the angle of each disc blade of the gang relative to the direction of travel and within the horizontal plane of the tillage implement). Adjusting the angle of the disc blades 32 relative to the horizontal plane 38 varies the angle of the disc blades 32 relative to the soil surface, thereby adjusting the interaction between the disc blades 32 and the soil. For example, depending on the angle of the disc blades relative to the direction of travel, adjusting the angle of the disc blades relative to the horizontal plane may vary the degree of tillage of the disc blades and/or the degree of compaction caused by the disc blades. In certain embodiments, the angle of the disc blades 32 relative to the horizontal plane 98 may be adjusted (e.g., alone or in combination with the angle of the disc blades 32 relative to the direction of travel) to establish a compromise between degree of tillage and compaction. In certain embodiments, the disc blade angle adjustment assembly is also configured to adjust the angle of each disc blade of the gang relative to the direction of travel of the tillage implement (e.g., the disc blade angle adjustment assembly may include a combination of the disc blade angle adjustment assembly disclosed with reference to FIG. 2 and the disc blade angle adjustment assembly disclosed with reference to FIG. 5). In such embodiments, the disc blade angle adjustment assembly may include an actuator (e.g., first actuator) configured to drive the disc blades to pivot relative to the direction of travel (e.g., as disclosed above with reference to FIG. 2), or the disc blade angle adjustment assembly may include a manual device configured to control the angle of the disc blades relative to the direction of travel (e.g., a lever, a handle, a pin/aperture assembly, etc.).

In the illustrated embodiment, the disc blade angle adjustment assembly 36' includes an actuator 96 (e.g., second actuator) configured to drive each disc blade 32 of the gang to pivot about the respective pivot joint 102 relative to the horizontal plane 98 of the tillage implement. In the illustrated embodiment, the actuator 96 includes an electric linear actuator. However, in other embodiments, the actuator may include another suitable type of actuating device (e.g., alone or in combination with the electric linear actuator), such as a pneumatic cylinder, a hydraulic motor, a pneumatic motor, an electric motor, a hydraulic cylinder, other suitable type(s) of actuating device(s), or a combination thereof. Furthermore, while the disc blade angle adjustment assembly 36' includes a single actuator 96 in the illustrated embodiment, in other embodiments, the disc blade angle adjustment assembly may include multiple actuators (e.g., 2, 3, 4, or more).

In the illustrated embodiment, the disc blade angle adjustment assembly 36' includes an actuating rod assembly 106 coupled to the actuator 96 and pivotally coupled to each disc blade 32 of the gang. The actuator 96 is configured to drive the actuating rod assembly 106 to drive each disc blade 32 of the gang to pivot about the respective pivot joint 102 relative to the horizontal plane 98 of the tillage implement. In the illustrated embodiment, the actuating rod assembly 106 includes a single actuating rod 108. However, in other embodiments, the actuating rod assembly may include multiple actuating rod segments (e.g., pivotally coupled to one another). Furthermore, in the illustrated embodiment, each disc blade 32 is pivotally coupled to the actuating rod assembly 106 via a respective pivot joint 110. The actuator 96 may drive the actuating rod assembly 106 to move in the first direction 64, thereby driving the disc blades 32 of the gang to pivot in a first pivot direction 112 relative to the horizontal plane 98 of the tillage implement. Furthermore, the actuator 96 may drive the actuating rod assembly 106 to move in the second direction 66, thereby driving the disc blades 32 of the gang to pivot in a second pivot direction 114 relative to the horizontal plane 98 of the tillage implement. While the disc blade angle adjustment assembly 36' includes the actuating rod assembly 106 in the illustrated embodiment, in other embodiments, the disc blade angle adjustment assembly may include another suitable mechanical linkage between the actuator and the disc blades (e.g., including one or more links, including one or more cables, such as Bowden cables, including one or more shafts, etc.).

In the illustrated embodiment, the actuator 96 is non-rotatably coupled to the shaft assembly 58'. Accordingly, the actuator 96 rotates with the shaft assembly 58'. As such, the electric linear actuator may receive electrical power via a slip ring. Furthermore, in embodiments in which the actuator includes a pneumatic or hydraulic actuator, fluid passages may extend through the shaft assembly to enable fluid flow between a fluid supply and the actuator. While the actuator 96 is non-rotatably coupled to the shaft assembly 58' in the illustrated embodiment, in other embodiments, the actuator may be coupled to the disc blade support or to the frame of the tillage implement. In such embodiments, a suitable mechanical linkage (e.g., including one or more links, including one or more cables, such as Bowden cables, including one or more shafts, etc.) may couple the actuator to the disc blades, thereby enabling the actuator to drive the disc blades of the gang to pivot relative to the horizontal plane of the tillage implement.

As previously discussed with reference to FIG. 4, the disc blade angle control system includes a controller having a memory and a processor. The controller is communicatively coupled to the actuator 96 (e.g., second actuator), and the controller is configured to control the actuator 96 to adjust the angle of each disc blade 32 of the gang relative to the horizontal plane 98 of the tillage implement. For example, in certain embodiments, the controller is configured to adjust the angle of each disc blade 32 of the gang based on an amount of residue on the surface of the field/soil, as previously discussed with reference to FIG. 4. Furthermore, in certain embodiments, the controller is configured to receive a signal indicative of a side load applied to the gang of disc blades. As previously discussed, the side load corresponds to a force applied to the gang of disc blades along the axis parallel to the rotational axis of the gang of disc blades. The controller is configured to control the actuator to adjust the angle of each disc blade of the gang relative to the horizontal plane based on the side load. While an actuator controlled by a controller is disclosed above, in certain embodiments, the actuator may be manually controlled (e.g., via a valve that controls fluid flow to the actuator, etc.).

While the disc blade angle adjustment assembly 36' includes the actuator 96 in the illustrated embodiment, in other embodiments, the actuator maybe omitted. In such embodiments, the disc blade angle adjustment assembly may enable an operator to manually adjust the angle of the disc blades relative to the horizontal plane. For example, the disc blade angle adjustment assembly may include a handle, a lever, a pin/aperture assembly, or another suitable adjustment device coupled to the actuating rod assembly/mechanical linkage to facilitate manual adjustment of the angle of the disc blades relative to the horizontal plane. While the disc blade angle adjustment assembly adjusts the angle of each disc blade of the gang relative to the horizontal plane in the illustrated embodiment, in other embodiments, the disc blade angle adjustment assembly may only adjust the angle of a portion of the disc blades of the gang relative to the horizontal plane. For example, in certain embodiments, the actuating rod assembly/mechanical linkage may only be coupled to a portion of the disc blades of the gang. Furthermore, while the disc blade angle adjustment assembly is configured to adjust the angle of each disc blade of the gang as a group in the illustrated embodiment, in other embodiments, the disc blade angle adjustment assembly may adjust a first angle of a first disc blade independently of a second angle of a second disc blade (e.g., the disc blade angle adjustment assembly may include multiple actuators). In addition, all of the features, functions, and variations disclosed above with regard to the illustrated disc blade angle adjustment assembly may apply to the other disc blade angle adjustment assemblies of the tillage implement (e.g., the other disc blade angle adjustment assemblies associated with the other respective gangs).

Figure 6:
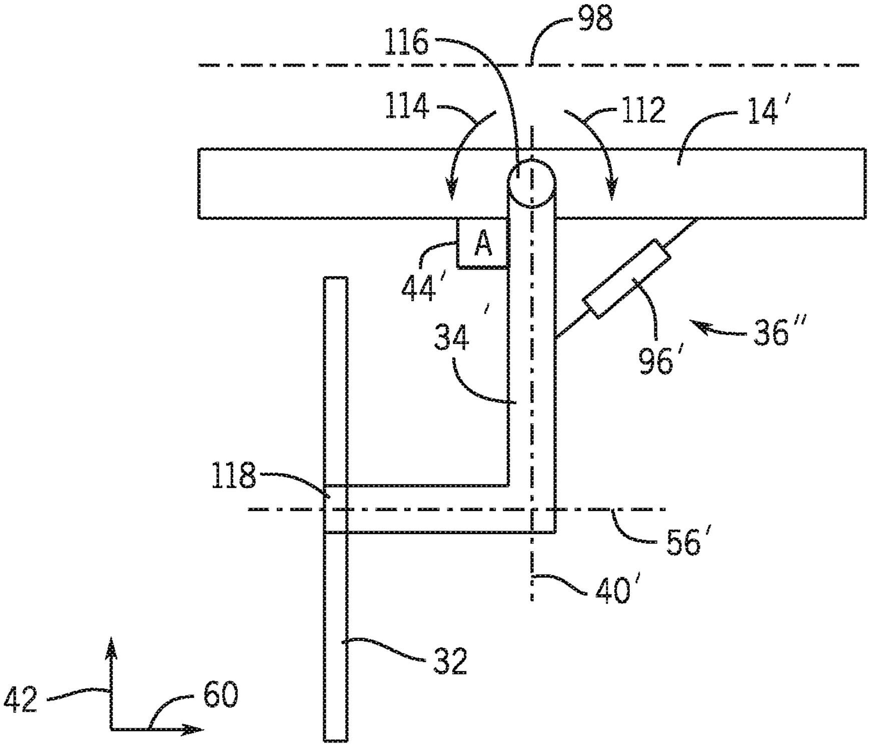
FIG. 6 is a schematic diagram of another embodiment of a disc blade angle adjustment assembly that may be employed within the tillage implement of FIG. 1.

FIG. 6 is a schematic diagram of another embodiment of a disc blade angle adjustment assembly 36" that may be employed within the tillage implement of FIG. 1. The disc blade angle adjustment assembly 36" may be employed within the disc blade angle control system disclosed above with reference to FIGS. 1-4 or within another suitable disc blade angle control system. As discussed in detail below, the disc blade angle adjustment assembly 36" is configured to adjust the angle of the disc blade 32 relative to the horizontal plane 98 of the tillage implement (e.g., agricultural implement). As previously discussed, the horizontal plane 98 extends through the frame of the tillage implement (e.g., agricultural implement). In certain embodiments, the horizontal plane of the tillage implement (e.g., agricultural implement) is parallel to the surface of the field (e.g., while the frame of the tillage/agricultural implement is parallel to the surface of the field).

In the illustrated embodiment, the tillage implement includes one or more individually mounted disc blades 32, such as the illustrated disc blade 32. The tillage implement may include any suitable number of individually mounted disc blades 32 (e.g., alone or in combination with one or more gangs of disc blades). As previously discussed, the disc blade 32 is configured to engage the soil and to break up a top layer of the soil, thereby tilling the soil as the tillage implement moves through the field along the direction of travel. Furthermore, as previously discussed, the tillage implement includes a frame 14', such as the frame disclosed above with reference to FIG. 1. The tillage implement also includes a disc blade support 34' pivotally coupled to the frame 14' by pivot joint 116. The pivot joint 116 is configured to enable the disc blade support 34' to pivot relative to the frame 14' of the tillage implement in the first pivot direction 112 and in the second pivot direction 114.

The disc blade 32 is rotatably coupled to the disc blade support 34', thereby enabling the disc blade 32 to pivot about a rotational axis 56'. In the illustrated embodiment, the disc blade 32 is rotatably coupled to the disc blade support 34' by a bearing assembly 118. The bearing assembly 118 includes at least one bearing that enables the disc blade 32 to rotate about the rotational axis 56'. Due to the rotational coupling between the disc blade 32 and the disc blade support 34', pivoting the disc blade support 34' about the pivot joint 116 in the first or second pivot direction pivots the disc blade 32 relative to the horizontal plane 98 of the tillage implement. In addition, in the illustrated embodiment, the rotational axis 56' pivots with the disc blade 32, such that the angle of the rotational axis 56' relative to the horizontal plane 98 varies as the disc blade 32 pivots relative to the horizontal plane 98 (e.g., as compared to the embodiment disclosed above with respect to FIG. 5, in which the angle of the rotational axis of the disc blades relative to the horizontal plane remains constant as the disc blades pivot relative to the horizontal plane). While one disc blade 32 is rotatably coupled to the disc blade support 34' in the illustrated embodiment, in other embodiments, two or more disc blades may be rotatably coupled to the disc blade support 34 (e.g., by respective bearing assemblies).

The disc blade angle adjustment assembly 36" is configured to adjust the angle of the disc blade 32 relative to the horizontal plane 98 of the tillage implement (e.g., as compared to the disc blade angle adjustment assembly disclosed above with reference to FIG. 2, which is configured to adjust the angle of the disc blade relative to the direction of travel and within the horizontal plane of the tillage implement). Adjusting the angle of the disc blade 32 relative to the horizontal plane 38 varies the angle of the disc blade 32 relative to the soil surface, thereby adjusting the interaction between the disc blade 32 and the soil. For example, depending on the angle of the disc blade relative to the direction of travel, adjusting the angle of the disc blade relative to the horizontal plane may vary the degree of tillage of the disc blade and/or the degree of compaction caused by the disc blade. In certain embodiments, the angle of the disc blade 32 relative to the horizontal plane 98 may be adjusted (e.g., alone or in combination with the angle of the disc blade 32 relative to the direction of travel) to establish a compromise between degree of tillage and compaction. In certain embodiments, the disc blade angle adjustment assembly is also configured to adjust the angle of the disc blade relative to the direction of travel of the tillage implement (e.g., the disc blade angle adjustment assembly may be configured to pivot at least a portion of the disc blade support to adjust the angle of the disc blade relative to the direction of travel of the tillage implement).

In the illustrated embodiment, the disc blade angle adjustment assembly 36" includes an actuator 96' (e.g., second actuator) configured to drive the disc blade 32 to pivot relative to the horizontal plane 98 of the tillage implement. In the illustrated embodiment, the actuator 96' includes a hydraulic cylinder. However, in other embodiments, the actuator may include another suitable type of actuating device (e.g., alone or in combination with the hydraulic cylinder), such as a pneumatic cylinder, a hydraulic motor, a pneumatic motor, an electric motor, an electric linear actuator, other suitable type(s) of actuating device(s), or a combination thereof. Furthermore, while the disc blade angle adjustment assembly 36" includes a single actuator 96' in the illustrated embodiment, in other embodiments, the disc blade angle adjustment assembly may include multiple actuators (e.g., 2, 3, 4, or more).

In the illustrated embodiment, the actuator 96' is coupled to the disc blade support 34' and to the frame 14'. The actuator 96' is configured to drive the disc blade support 34' to pivot about the pivot joint 116 in the first and second pivot directions, thereby adjusting the angle of the disc blade 32 relative to the horizontal plane 98 of the tillage implement. While the actuator 96' is coupled to the disc blade support 34' and to the frame 14' in the illustrated embodiment, in other embodiments, the actuator may be coupled to one of the disc blade support or the frame. In such embodiments, a suitable mechanical linkage (e.g., including one or more links, including one or more cables, such as Bowden cables, including one or more shafts, etc.) may couple the actuator to the other of the disc blade support or the frame, thereby enabling the actuator to drive the disc blade to pivot relative to the horizontal plane of the tillage implement.

As previously discussed with reference to FIG. 4, the disc blade angle control system includes a controller having a memory and a processor. The controller is communicatively coupled to the actuator 96' (e.g., second actuator), and the controller is configured to control the actuator 96' to adjust the angle of the disc blade 32 relative to the horizontal plane 98 of the tillage implement. For example, in certain embodiments, the controller is configured to adjust the angle of the disc blade 32 based on an amount of residue on the surface of the field/soil, as previously discussed with reference to FIG. 4. Furthermore, in certain embodiments, the controller is configured to receive a signal indicative of a side load applied to the disc blade (e.g., via a sensor system having a load cell positioned between the disc blade and the disc blade support, a strain gauge coupled to the disc blade support and oriented to monitor deflection of the disc blade support in the first/second pivot directions, etc.). As previously discussed, the side load corresponds to a force applied to the disc blade along the axis parallel to the rotational axis of the disc blade. The controller is configured to control the actuator to adjust the angle of the disc blade relative to the horizontal plane based on the side load. While an actuator controlled by a controller is disclosed above, in certain embodiments, the actuator may be manually controlled (e.g., via a valve that controls fluid flow to the actuator, etc.).

While the disc blade angle adjustment assembly 36" includes the actuator 96' in the illustrated embodiment, in other embodiments, the actuator maybe omitted. In such embodiments, the disc blade angle adjustment assembly may enable an operator to manually adjust the angle of the disc blade relative to the horizontal plane. For example, the disc blade angle adjustment assembly may include a handle, a lever, a pin/aperture assembly, or another suitable adjustment device coupled to the disc blade support to facilitate manual adjustment of the angle of the disc blade relative to the horizontal plane.

Furthermore, in certain embodiments, the disc blade angle adjustment assembly 36" is configured to adjust the angle of the disc blade 32 relative to the direction of travel of the tillage implement. For example, in certain embodiments, the disc blade angle adjustment assembly 36" includes an actuator 44' (e.g., first actuator) configured to drive the disc blade support 34' to rotate about a pivot axis 40', thereby controlling the angle of the disc blade 32 relative to the direction of travel (e.g., relative to the longitudinal axis of the tillage implement). By way of example, the pivot joint may couple the disc blade support to a disc, which is pivotally coupled to the frame, and the actuator (e.g., first actuator) may drive the disc to rotate about the pivot axis. The second actuator (e.g., the actuator configured to drive the disc blade to pivot relative to the horizontal plane) may be coupled to the disc, such that the second actuator rotates with the disc blade support. By way of further example, the pivot joint may be coupled to a second disc blade support (e.g., such as the disc blade support disclosed above with reference to FIG. 2), which is pivotally coupled to the frame, and the actuator (e.g., first actuator) may drive the second disc blade support to rotate (e.g., as disclosed above with regard to rotation of the disc blade support of FIG. 2 relative to the frame). Furthermore, in certain embodiments, the actuator may be configured to drive one portion of the disc blade support 34' to rotate relative to another portion of the disc blade support 34'. For example, the horizontal portion of the disc blade support 34' may be pivotally coupled to the vertical portion of the disc blade support 34', such that the horizontal portion is pivotable about the pivot axis 40'. The actuator (e.g., first actuator) may drive the horizontal portion to rotate about the pivot axis relative to the vertical portion, thereby adjusting the angle of the disc blade relative to the direction of travel. Furthermore, in certain embodiments, the angle of the disc blade relative to the direction of travel may be manually adjusted (e.g., via a lever, a handle, a pin/aperture assembly, etc.), and the respective actuator (e.g., first actuator) may be omitted.

All of the features, functions, and variations disclosed above with regard to the illustrated disc blade angle adjustment assembly may apply to other disc blade angle adjustment assembly/assemblies of the tillage implement (e.g., other disc blade angle adjustment assemblies associated with other independently mounted disc blades). Furthermore, while embodiments of a disc blade angle adjustment assembly are disclosed above with reference to FIGS. 5-6, in certain embodiments, the disc blade angle control system may include another suitable disc blade angle adjustment assembly configured to adjust the angle of disc blade(s) of the tillage implement relative to the horizontal plane of the tillage implement. In addition, in embodiments that include a disc blade angle adjustment assembly configured to adjust the angle of the disc blade(s) relative to the horizontal plane, the sensor system may include one or more sensors associated with the disc blade angle adjustment assembly. For example, with regard to the disc blade angle adjustment assembly of FIG. 5, the sensor system may include sensor(s) (e.g., load cell(s), strain gauge(s)) coupled to the actuating rod assembly and configured to output signal(s) indicative of the side load applied to the disc blades of the gang. Furthermore, with regard to the disc blade angle adjustment assembly of FIG. 6, the sensor system may include sensor(s) (e.g., load cell(s), strain gauge(s)) coupled to the disc blade support and configured to output signal(s) indicative of the side load applied to the disc blade. In addition, in certain embodiments, the sensor system may include a sensor (e.g., fluid pressure sensor, load cell, strain gauge, etc.) configured to monitor the force applied by the respective actuator (e.g., second actuator) configured to drive the disc blade(s) to pivot relative to the horizontal plane, thereby outputting a signal indicative of the side load applied to the disc blade(s).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A disc blade angle control system for an agricultural implement, comprising:

a sensor system configured to output a signal indicative of a side load applied to a disc blade of the agricultural implement, wherein the disc blade is configured to engage soil, the side load corresponds to a force applied to the disc blade along an axis parallel to a rotational axis of the disc blade, the sensor system comprises a load cell positioned between a concave side or a convex side of the disc blade and a bearing along the axis parallel to the rotational axis of the disc blade, and the bearing is configured to facilitate rotation of the disc blade; and a controller comprising a memory and a processor, wherein the controller is configured to:

receive the signal from the sensor system; and control an actuator to adjust an angle of the disc blade based on the side load;

wherein the actuator is configured to adjust the angle of the disc blade relative to a horizontal plane of the agricultural implement.

2. The disc blade angle control system of claim 1, wherein the controller is configured to control the actuator to adjust the angle of the disc blade such that the side load is within a threshold range of a target side load.

3. The disc blade angle control system of claim 2, wherein the controller is configured to determine the target side load via machine learning.

4. The disc blade angle control system of claim 1, wherein the controller is configured to:

receive a second signal indicative of a second side load applied to a second disc blade of the agricultural implement, wherein the second disc blade is configured to engage the soil, and the second side load corresponds to a second force applied to the second disc blade along a second axis parallel to a second rotational axis of the second disc blade; and control a second actuator, independently of the actuator, to adjust a second angle of the second disc blade based on the second side load.

5. The disc blade angle control system of claim 4, wherein the second actuator is configured to adjust the second angle of the second disc blade relative to a direction of travel of the agricultural implement or relative to the horizontal plane of the agricultural implement.

6. The disc blade angle control system of claim 1, wherein the controller is configured to control another actuator to adjust another angle of the disc blade relative to a direction of travel of the agricultural implement based on the side load.

7. A disc blade angle control system for an agricultural implement, comprising:

a sensor system configured to output a signal indicative of a side load applied to a disc blade of the agricultural implement, wherein the disc blade is configured to engage soil, the side load corresponds to a force applied to the disc blade along an axis parallel to a rotational axis of the disc blade, the sensor system comprises a load cell positioned between a concave side or a convex side of the disc blade and a bearing along the axis parallel to the rotational axis of the disc blade, and the bearing is configured to facilitate rotation of the disc blade;

an actuator configured to adjust an angle of the disc blade; and a controller comprising a memory and a processor, wherein the controller is communicatively coupled to the sensor system and to the actuator, and the controller is configured to:

receive the signal from the sensor system; and control the actuator to adjust the angle of the disc blade based on the side load.

8. The disc blade angle control system of claim 7, wherein the actuator is configured to adjust the angle of the disc blade relative to a direction of travel of the agricultural implement or relative to a horizontal plane of the agricultural implement.

9. The disc blade angle control system of claim 7, comprising:

a second sensor system configured to output a second signal indicative of a second side load applied to a second disc blade of the agricultural implement, wherein the second disc blade is configured to engage the soil, and the second side load corresponds to a second force applied to the second disc blade along a second axis parallel to a second rotational axis of the second disc blade; and a second actuator configured to adjust a second angle of the second disc blade;

wherein the controller is communicatively coupled to the second sensor system and to the second actuator, and the controller is configured to:

receive the second signal from the second sensor system, and control the second actuator, independently of the actuator, to adjust the second angle of the second disc blade based on the second side load.

10. The disc blade angle control system of claim 7, wherein the controller is configured to control the actuator to adjust the angle of the disc blade such that the side load is within a threshold range of a target side load.

11. The disc blade angle control system of claim 10, wherein the controller is configured to determine the target side load via machine learning.

12. An agricultural implement, comprising:

a disc blade configured to engage soil;

a bearing configured to facilitate rotation of the disc blade about a rotational axis of the disc blade; and a disc blade angle control system, comprising:

a sensor system configured to output a signal indicative of a side load applied to the disc blade, wherein the side load corresponds to a force applied to the disc blade along an axis parallel to the rotational axis of the disc blade, and the sensor system comprises a load cell positioned between a concave side or a convex side of the disc blade and the bearing along the axis parallel to the rotational axis of the disc blade;

an actuator configured to adjust an angle of the disc blade; and a controller comprising a memory and a processor, wherein the controller is communicatively coupled to the sensor system and to the actuator, and the controller is configured to:

receive the signal from the sensor system; and control the actuator to adjust the angle of the disc blade based on the side load.

13. The agricultural implement of claim 12, wherein the actuator is configured to adjust the angle of the disc blade relative to a direction of travel of the agricultural implement or relative to a horizontal plane of the agricultural implement.

14. The agricultural implement of claim 12, wherein the controller is configured to control the actuator to adjust the angle of the disc blade such that the side load is within a threshold range of a target side load.

15. The agricultural implement of claim 14, wherein the controller is configured to determine the target side load via machine learning.

* * * * *